United States Patent
Asanuma et al.

[11] Patent Number: 5,996,978
[45] Date of Patent: Dec. 7, 1999

[54] HYDRAULIC DAMPER FOR VEHICLE

[75] Inventors: Nobuyoshi Asanuma; Yukio Hayakawa; Satoshi Kondo, all of Saitama-ken, Japan

[73] Assignee: Honda Giken Kogyo Kabushiki Kaisha, Tokyo, Japan

[21] Appl. No.: 08/877,403

[22] Filed: Jun. 17, 1997

[30] Foreign Application Priority Data

Aug. 27, 1996 [JP] Japan ................................... 8-224832
Aug. 27, 1996 [JP] Japan ................................... 8-224833
Aug. 27, 1996 [JP] Japan ................................... 8-224834

[51] Int. Cl.⁶ .................................................. B60G 11/56
[52] U.S. Cl. .............................. 267/34; 267/35; 267/221; 188/315
[58] Field of Search .......................... 267/33–35, 64.25, 267/64.26, 221; 188/315, 318, 322.12, 322.21

[56] References Cited

U.S. PATENT DOCUMENTS

| | | | |
|---|---|---|---|
| 2,519,605 | 8/1950 | Rossman | 188/315 |
| 2,537,423 | 1/1951 | Rossman | 188/315 |
| 3,083,000 | 3/1963 | Perdue | 267/64.26 |
| 3,145,985 | 8/1964 | Bourcier de Carbon | 267/34 |
| 3,173,671 | 3/1965 | Broadwell | 188/315 |
| 3,794,309 | 2/1974 | Chrokey et al. | 267/34 |
| 3,936,039 | 2/1976 | McKinnon | 267/34 |
| 4,054,277 | 10/1977 | Sirven | 188/318 |
| 4,328,960 | 5/1982 | Handke et al. | 267/34 |
| 4,720,085 | 1/1988 | Shinbori et al. | 267/44.16 |

FOREIGN PATENT DOCUMENTS

| | | | |
|---|---|---|---|
| 0014637 | 2/1981 | Japan | 188/315 |
| 22/2415 | 1/1986 | Japan | 188/315 |

*Primary Examiner*—Chris Schwartz
*Attorney, Agent, or Firm*—Armstrong, Westerman, Hattori, McLeland & Naughton

[57] ABSTRACT

In a first type, there is provided, inside an inner tube of a twin-tube type of damper, a pressurizing chamber to be defined by a free piston which is slidably fit onto an outer surface of a rod. A fluid pressure from an outside pressure source is supplied to the pressurizing chamber to push down a damper piston via the free piston to thereby forcibly contract the damper. In a second type, there is provided inside an inner tube a cylinder which is slidably fit onto an outer surface of a rod, and a piston mounted on the rod is inserted into the cylinder. A fluid pressure from the pressure source is supplied to the pressurizing chamber inside the cylinder to push down the rod via the piston to thereby forcibly contract the damper. In a third type, a rod is slidably inserted into a partition wall in an intermediate portion of a damper main body of a mono-tube type of damper. A free piston which is prevented by a stopper member from dropping out of position downwards is slidably mounted onto an outer surface of a rod portion below the partition wall. A fluid pressure from a pressure source is supplied to a pressurizing chamber to be defined between the partition wall and the free piston. The rod is pushed down via the free piston and the stopper member to thereby forcibly contract the damper.

4 Claims, 6 Drawing Sheets

FIG. 3A
FIG. 3B
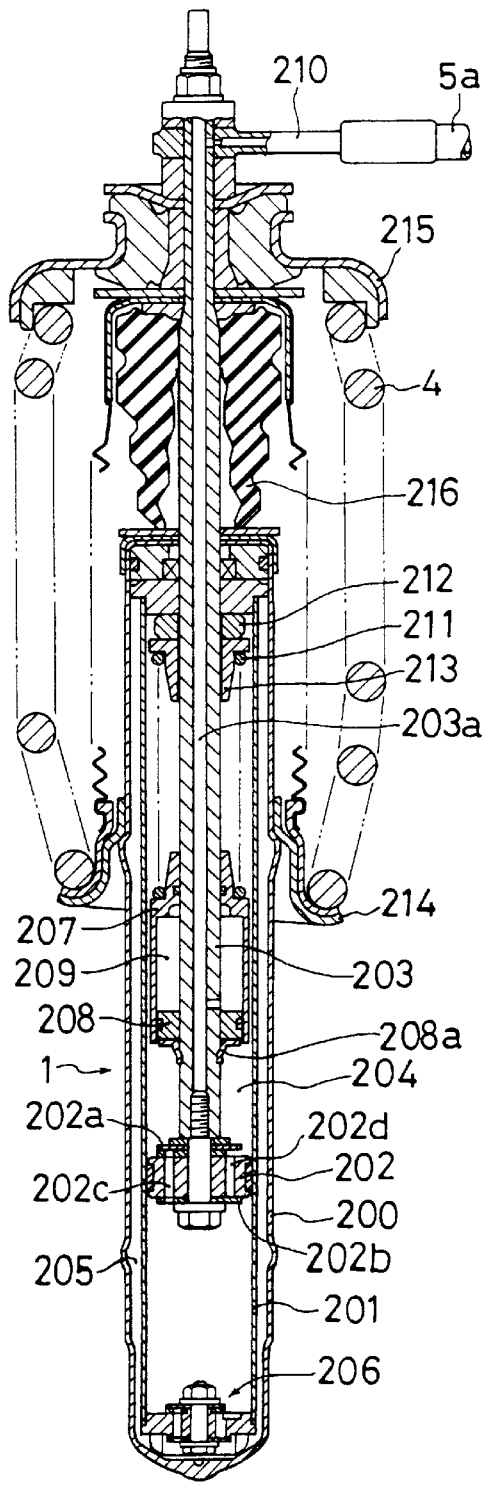
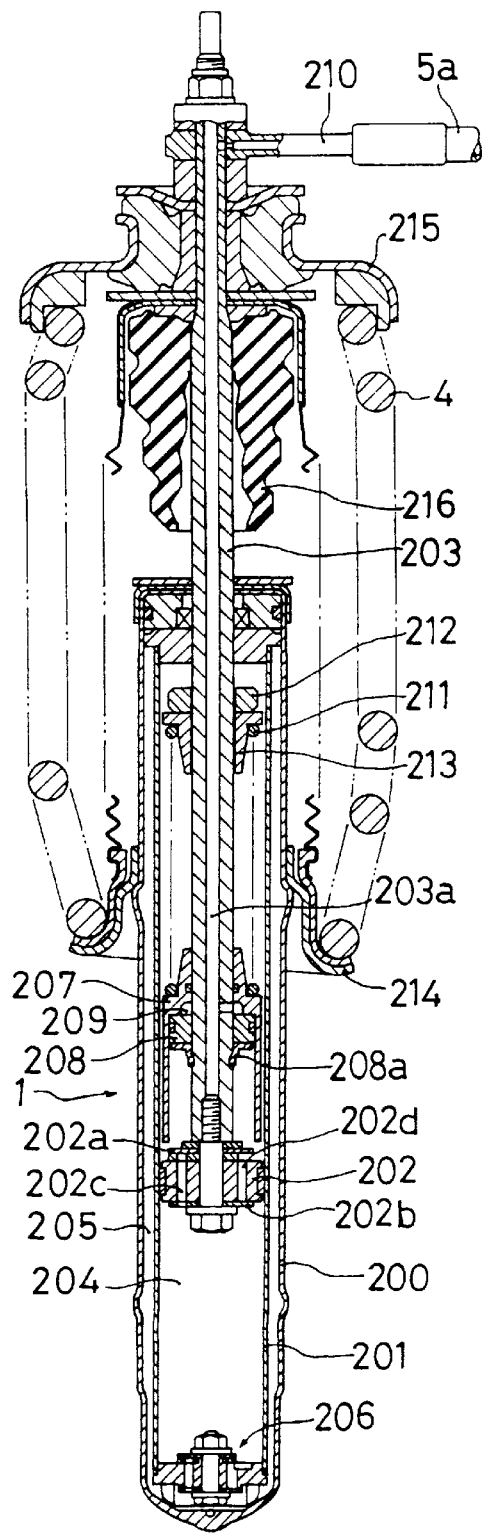

HYDRAULIC DAMPER FOR VEHICLE

BACKGROUND OF THE INVENTION

1. Field of the Invention

The present invention relates to a hydraulic damper for a vehicle such as a motor vehicle which has a function of controlling (or adjusting) a height of the vehicle as well as its rolling rigidity (i.e., the rigidity with which the vehicle is rolled about a longitudinal axis of the vehicle).

2. Description of the Related Art

As a hydraulic damper for a vehicle, there has hitherto been known a twin-tube type and a mono-tube type. The twin-tube type of hydraulic damper is provided with an outer tube, an inner tube, and a rod provided at its lower end with a damper piston which is equipped with a valve mechanism. An oil chamber for inserting thereinto the damper piston is provided inside the inner tube. A reserve chamber which is in fluid flow communication with the oil chamber is provided between the outer tube and the inner tube.

The mono-tube type of hydraulic damper is provided with a cylindrical damper main body and a rod having mounted on a lower end thereof a damper piston which is equipped with a valve mechanism. An oil chamber into which the damper piston is inserted is provided inside the damper main body.

In order to improve the moving performance at the time of high-speed running, it becomes necessary to lower the vehicle height and to increase the rolling rigidity. Here, if the hydraulic damper is forcibly pushed and contracted, it becomes possible to lower the vehicle height and also to increase the rolling rigidity by regulating the lifting of the vehicle body on the side of the inner wheel at the time of cornering.

In view of the above-described points, the present invention has an object of providing such a hydraulic damper for a vehicle as will be able to be forcibly pushed and contracted by a hydraulic pressure from an outside pressure source.

SUMMARY OF THE INVENTION

In order to attain the above-described and other objects, according to a first aspect of the present invention, there is provided a hydraulic damper for a vehicle comprising: an outer tube; an inner tube; a rod provided at its lower end with a damper piston equipped with a valve mechanism; wherein an oil chamber for inserting thereinto the damper piston is provided inside the inner tube; and wherein a reserve chamber which is in fluid flow communication with the oil chamber is provided between the outer tube and the inner tube. A free piston which is slidably fit onto an outer surface of the rod above the damper piston is slidably inserted into the inner tube. And a pressurizing chamber which is partitioned from the oil chamber by the free piston and is adapted to receive a fluid pressure from an outside pressure source is provided in an upper portion of the inner tube.

According to a second aspect of the present invention, the above-described and other objects are attained by a hydraulic damper for a vehicle comprising: an outer tube; an inner tube; a rod which is provided at its lower end with a damper piston equipped with a valve mechanism; wherein an oil chamber for inserting thereinto the damper piston is provided inside the inner tube; and wherein a reserve chamber which is in fluid flow communication with the oil chamber is provided between the outer tube and the inner tube. A cylinder which is slidably fit onto an outer surface of the rod is provided inside the inner tube. A piston which is inserted into the cylinder is provided on the rod above the damper piston. And a pressurizing chamber which urges the rod downwards via the piston and which is adapted to receive a fluid pressure from an outside pressure source is provided inside the cylinder.

According to a third aspect of the present invention, the above-described and other objects are attained by a hydraulic damper for a vehicle comprising: a cylindrical damper main body; a rod which is provided with a damper piston equipped with a valve mechanism; wherein an oil chamber for inserting thereinto the damper piston is provided inside the damper main body. A partition wall for slidably penetrating thereinto the rod is fixedly provided in a vertically intermediate portion inside the damper main body such that the damper piston is mounted on that portion of the rod which lies above the partition wall, whereby that space inside the damper main body which lies above the partition wall is constituted into the oil chamber. A free piston is slidably fit onto an outer surface of that portion of the rod which lies below the partition wall in a manner prevented by a stopper member from being pulled downwards out of position relative to the rod. And the free piston is slidably inserted into that portion of the damper main body which lies below the partition wall such that a pressurizing chamber which is adapted to receive a fluid pressure from an outside pressure source is provided between the partition wall and the free piston.

According to the first aspect of the present invention, when the pressurizing chamber is pressurized by the fluid pressure from the pressure source, the free piston is pushed down. In accordance with this movement, the damper piston is also pushed down and the hydraulic damper is contracted, resulting in lowering of the vehicle height. If an elastic member is disposed inside the inner tube between the free piston and the damper piston, the elastic member is pinched or sandwitched between the free piston and the damper piston when the hydraulic damper is contracted. Consequently, the upward movement of the damper piston, i.e., the expansion of the hydraulic damper is restrained by the elastic member. In this manner, the lifting of the vehicle body on the side of the inner wheel at the time of cornering can be restrained and the rolling rigidity can be increased. When the pressurizing chamber is not pressurized, the free piston moves up and there will occur a clearance between the free piston and the elastic member. Until the damper piston has moved up by an amount equivalent to this clearance, the elastic member will not be compressed and, during that period of time, the expansion of the hydraulic damper will not be restrained by the elastic member. Therefore, the wheel rate can be made variable depending on the presence or absence of pressurizing of the pressurizing chamber. It can thus be possible to improve the cushion characteristics by making the pressurizing chamber free from pressurizing at the time of low-speed running, and the moving performance can be improved by pressurizing the pressurizing chamber at the time of high-speed running.

When the upward urging force from the damper piston is transmitted to the free piston via the elastic member, there is a possibility that an adverse effect will be given to the pressure source. It is, therefore, preferable to provide a lock member inside the inner tube between the free piston and the elastic member so that, when the upward urging force from the damper piston is operated via the elastic member, the transmission of the upward urging force to the free piston is blocked by biting of the lock member into the inner tube.

In the twin-tube type of hydraulic damper, there is a case in which a bottom valve is provided at a lower end of the inner tube so that the oil flow from the oil chamber to the reserve chamber is regulated to generate an attenuating force in the contraction stroke of the hydraulic damper. In this case, if there is provided a pressure chamber which urges the bottom valve towards a closing side and into which the fluid pressure from the outside pressure source can be introduced, the pressure chamber can be pressurized by the fluid pressure at the time of high-speed running. The attenuation force against the sinking of the vehicle body on the side of the outer wheel at the time of cornering can thereby be increased, and the moving performance can further be improved.

According to the second aspect of the present invention, when the pressurizing chamber is pressurized by the fluid pressure from the pressure source, the rod is pushed down via the piston. The hydraulic damper is thus contracted to thereby lower the vehicle height. If an elastic member is disposed inside the inner tube between the cylinder and an upper end of the inner tube, the push-down reaction force of the rod is received by the elastic member via the cylinder. In this condition, the upward movement of the rod, i.e., the expansion of the hydraulic damper is restrained by the elastic member. Therefore, the lifting of the vehicle body on the side of the inner wheel at the time of cornering is restrained by the elastic member, resulting in an increased rolling rigidity. When the pressurizing chamber is not pressurized, the elastic member is not contracted until the rod has moved up to a certain height. During that period, the expansion of the hydraulic damper is not restrained by the elastic member. Therefore, like in the above-described first aspect of the present invention, the wheel rate can be made variable depending on the presence or absence of pressurizing in the pressurizing chamber. It is thus possible to improve the cushion characteristics by making the pressurizing chamber free from pressurizing at the time of low-speed running and also to improve the moving performance by pressurizing the pressurizing chamber at the time of high-speed running.

Further, according to the second aspect of the present invention, since the pressurizing chamber is provided inside the cylinder which is fit onto an outer surface of the rod, the rod can be formed into a hollow shape so that the fluid pressure can be introduced into the pressurizing chamber through the hollow portion. If a coupling portion for the piping material such as a hose which is coupled to the pressure source is provided at an upper end of the rod, the piping material can be disposed above the damper. Therefore, the damage to the piping material due to flying stones or the like can be prevented.

According to the third aspect of the present invention, when the pressurizing chamber is pressurized by the fluid pressure from the pressure source, the rod is pushed down via the free piston and the stopper member. The hydraulic damper is thus forcibly contracted to thereby lower the vehicle height. At the same time, the expansion of the hydraulic damper is regulated by the pressurizing force in the pressurizing chamber. The lifting of the vehicle body on the side of the inner wheel at the time of cornering is thus restrained, and the rolling rigidity is increased.

If the stopper member is constituted by an elastic member, the expansion of the stopper member can advantageously be restricted in an elastic manner.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 3A is a vertical sectional view of a second embodiment of the hydraulic damper of the present invention in a contracted state and FIG. 3B is a vertical sectional view thereof in its non-contracted state;

DETAILED DESCRIPTION OF PREFERRED EMBODIMENTS

Figure 1:
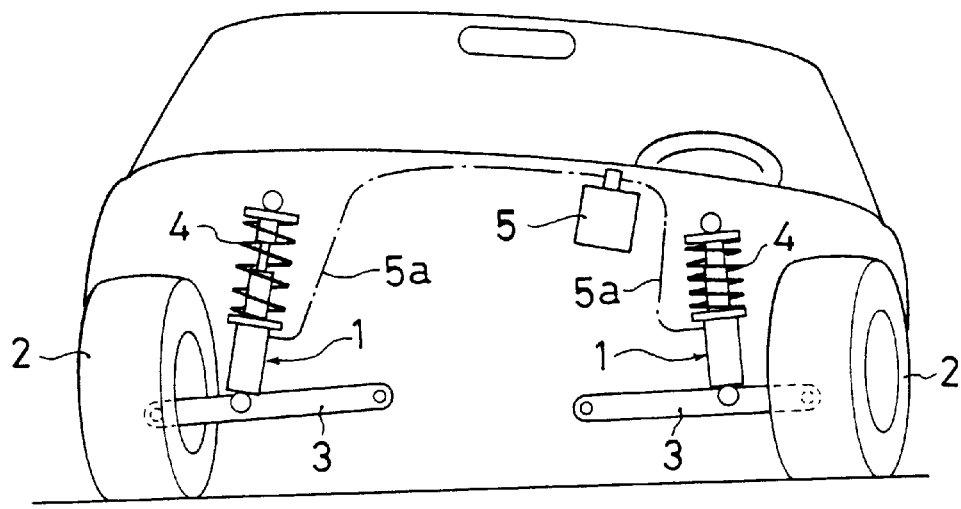
FIG. 1 is a schematic view showing an example of using the hydraulic damper of the present invention.

With reference to FIG. 1, reference numeral 1 denotes a hydraulic damper for a vehicle such as a motor vehicle. Each of right and left hydraulic dampers 1 is coupled, at a lower end of a damper main body, to a lower arm 3 of each of right and left suspensions which suspend each of the right and left wheels 2, respectively. An upper end of a rod 103, which is referred to hereinafter, of each of the hydraulic dampers 1 is coupled to a motor vehicle body. Each of the hydraulic dampers 1 is provided in its outer periphery with a suspension spring 4.

Figure 2:
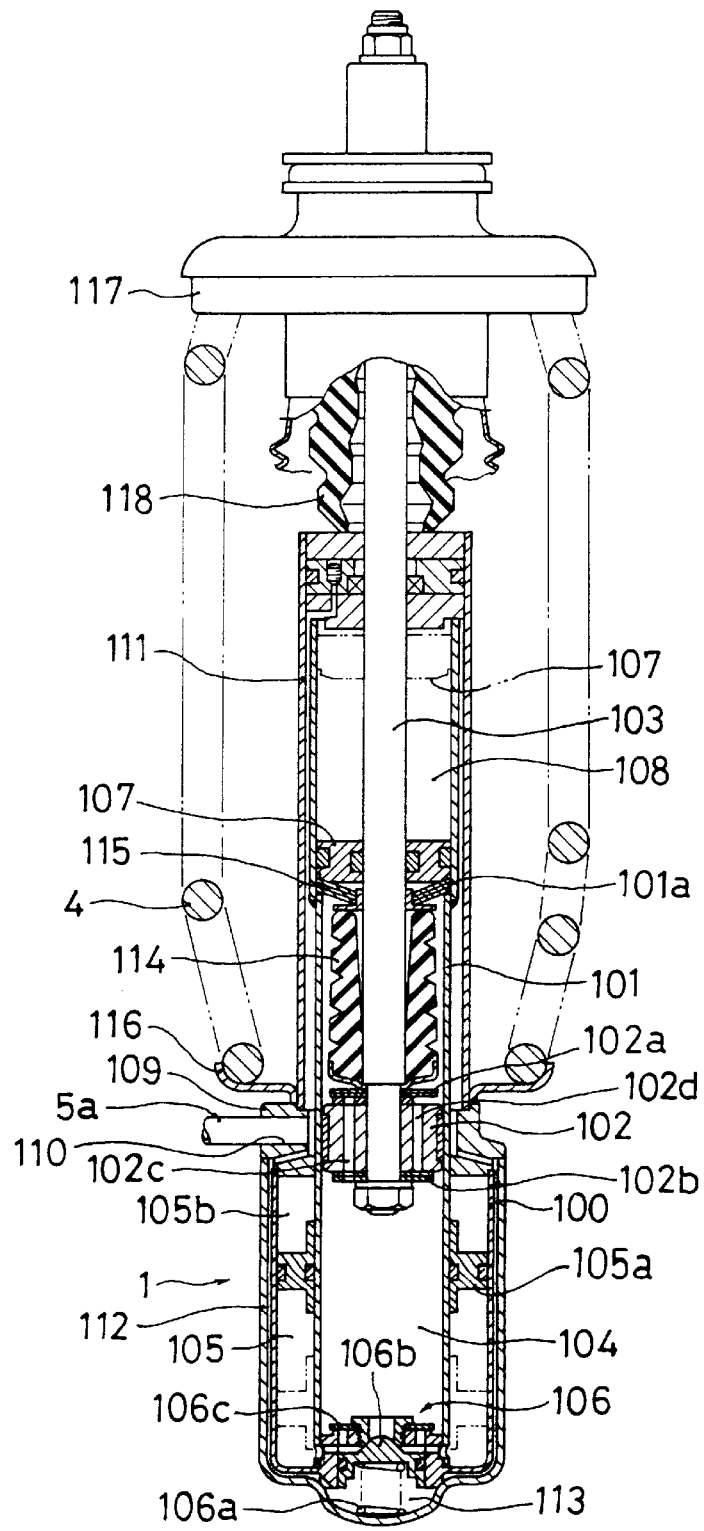
FIG. 2 is a vertical sectional view of a first embodiment of the hydraulic damper of the present invention.

As shown in FIG. 2, each of the hydraulic dampers 1 is provided with a damper main body which is made up of an outer tube 100 and an inner tube 101, and with a rod 103 which is provided at its lower end with a damper piston 102 which is equipped with a valve mechanism. An oil chamber 104 into which the damper piston 102 is inserted is provided inside the inner tube 101. The outer tube 100 is provided in such a manner as to enclose a lower half portion of the inner tube 101. A reserve chamber 105 is thus formed between the outer tube 100 and the inner tube 101. The oil chamber 104 and the reserve chamber 105 are arranged to be in fluid flow communication with each other via a bottom valve 106 which is provided at a bottom end of the inner tube 101. A so-called twin-tube type of damper is thus constituted. An upper portion of the reserve chamber 105 is constituted into a gas chamber 105b which is partitioned by a piston 105a which is movable up and down. A change in the oil amount in the reserve chamber 105 is absorbed by the expansion and contraction of the gas chamber 105b in order to prevent cavitation.

Valve plates 102a, 102b which constitute the valve mechanism are provided on upper and lower surfaces of the damper piston 102. In a contraction stroke in which the rod 103 moves downward, oil in a lower piston chamber portion of the oil chamber 104 passes through a hole which is formed in the valve plate 102b on the lower surface and an oil hole 102c which is formed in the damper piston 102. The valve plate 102a on the upper surface is thus pushed upwards, so that the oil flows into an upper piston chamber portion of the oil chamber 104. In an expansion stroke, on the other hand, in which the rod 103 moves upwards, oil in the upper piston chamber portion passes through the clearance between the valve plate 102a on the upper surface and the damper piston 102, as well as through an oil hole 102d which is formed in the damper piston 102. The valve plate 102b on the lower surface is thus pushed downwards, so that the oil flows into the lower piston chamber portion. By means of a flow resistance to be given by the valve plates 102a, 102b, an attenuating force is generated in the contraction stroke and in the expansion stroke. Instead of the valve plate 102b, an orifice which is communicated with the oil hole 102d may be provided on the lower surface of the damper piston 102.

The bottom valve 106 is provided with a valve body 106b which regulates the flow of oil from the oil chamber 104 to the reserve chamber 105 and which is urged by a spring 106a towards an upward closing side, and with a valve plate 106c which regulates the flow of oil from the reserve chamber 105 to the oil chamber 104. In the contraction stroke, the valve body 106b is pushed down to thereby cause the oil equivalent to the volume of the rod 103 which has entered into the oil chamber 104 in the contraction stroke, to flow from the oil chamber 104 to the reserve chamber 105. In the expansion stroke, on the other hand, the valve plate 106c is pulled up to thereby cause the oil equivalent to the volume of the rod 103 which has been pulled out of the oil chamber 104 in the expansion stroke, to flow from the reserve chamber 105 into the oil chamber 104. An attenuating force in the contraction stroke and in the extension stroke is generated also by the flow resistance to be given by the valve body 106b and the valve plate 106c.

In a position above the damper piston 102, the rod 103 has a free piston 107 which is slidably inserted or fit onto an outer surface of the rod 103. The free piston 107 is slidably inserted into an inner surface of the inner tube 101. A pressurizing chamber 108 which is partitioned from the oil chamber 104 by the free piston 107 is provided in an upper portion of the inner tube 101. In an outer ring 109 which constitutes an upper end partition wall of the reserve chamber 105 and which is fixed, by fitting, to an intermediate outer periphery of the inner tube 101, there is formed a port 110 which is coupled to a pressure source 5, which is referred to in detail hereinafter, via a piping material 5a such as a hose or the like. There is further provided an upper cover 111 which covers an upper half portion of the inner tube 101. The pressurizing chamber 108 is thus communicated with the port 110 via the clearance between the inner tube 101 and the upper cover 111 so that the fluid pressure from the pressure source 5 can be introduced into the pressurizing chamber 108.

There is further provided a lower cover 112 which covers the outer tube 100. A pressure chamber 113 which urges the valve body 106b of the bottom valve 106 to an upward closing side is formed in the bottom portion of the lower cover 112. This pressure chamber 113 is communicated with the port 110 via a clearance between the outer tube 100 and the lower cover 112 so that the pressure chamber 113 can be pressurized, like the pressurizing chamber 108, by the fluid pressure from the pressure source 5.

An elastic member 114 which functions as a rebound stopper is provided inside the inner tube 101 so as to position between the free piston 107 and the damper piston 102. Though the elastic member 114 is made of rubber in this embodiment, it may, of course, be constituted by a coil spring. Between the elastic member 114 and the free piston 107 there is provided a lock member 115 which is made of a dish-like spring of a tapered cone shape with the upper end becoming wider in diameter. According to this arrangement, when the elastic member 114 is compressed between the damper piston 102 and the free piston 107 by an upward urging of the damper piston 102, there is attained a locked condition by the biting of the lock member 115 into the inner tube 101. When the free piston 107 is displaced upward as shown by the dotted lines in FIG. 2, with the result that the free piston 107 is away from the lock member 115, the lock member 115 will not bite into the inner tube 101 even if the upward urging force is applied. The damper piston 102 can then move upward beyond the illustrated position. The transmission of the upward urging force to the free piston 107 is thus blocked.

On the outer ring 109, there is provided a lower spring receiver 116 which receives the lower end of the suspension spring 4. On an upper portion of the rod 103, there is provided an upper spring receiver 117 which abuts with the upper end of the suspension spring 4. Further, the upper spring receiver 117 is provided with a bump stop rubber 118 in a manner vertically extending therefrom. It is thus so arranged that, when the free piston 107 is pushed down to a lower end position that is restricted by a stepped portion 101a on the inner surface of the inner tube 101 whereby the hydraulic damper 1 is forcibly contracted, the bump stop rubber 118 is abutted with the upper end of the damper main body.

Figure 6:
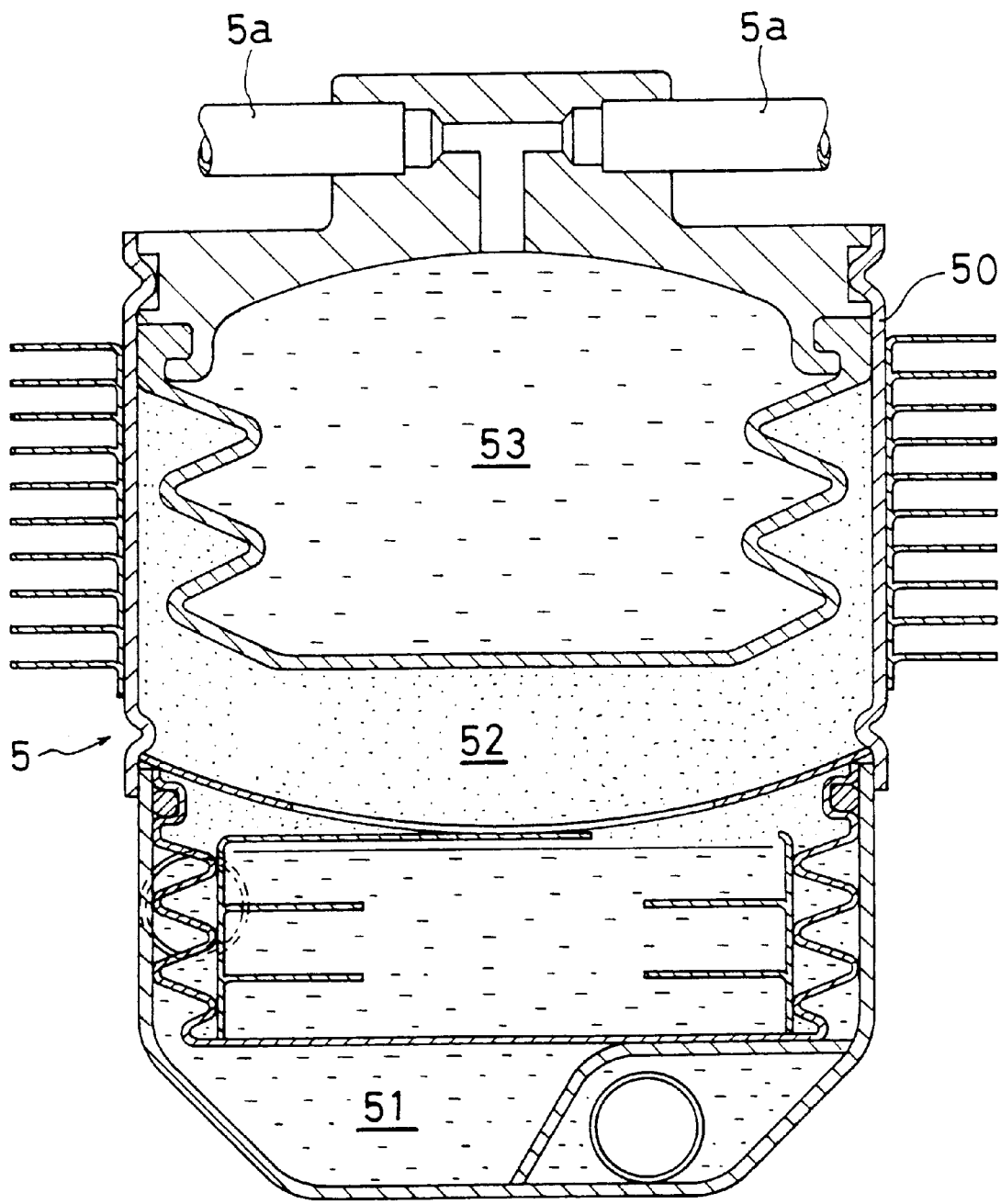
FIG. 6 is a vertical sectional view of an example of a pressure source.

Although a hydraulic pump that is driven by an electric motor or by an internal combustion engine may be used as the pressure source 5, this will result in a poor specific fuel consumption. As a solution, in the present embodiment, there is used a pressure source of a type of utilizing a waste heat which generates a hydraulic pressure by utilizing heat of a cooling medium such as water and oil (hereinafter called cooling water) for cooling a driving source of the vehicle, for example, an internal combustion engine or an electric motor in an electrically driven vehicle. Details thereof are shown in FIG. 6. Inside a casing 50 there are provided a heating chamber 51 for passing therein cooling water, a heat-pressure converting chamber 52 which is filled with a low boiling point medium such as ammonia, substitute Freon (e.g., Freon 134a) or the like, and an oil chamber 53 which is made up of bellows contained inside the heat-pressure converting chamber 52. The medium inside the heat-pressure converting chamber 52 is heated and evaporated by the heat of the cooling water, and the oil chamber 53 is compressed by the vapor pressure of the medium, whereby the hydraulic pressure is generated. When the free piston 107 is pushed up as a result of pushing up of the damper piston 102, there is a possibility that the hydraulic oil is pushed back from the pressurizing chamber 108 into the oil chamber 53 to thereby damage the bellows. However, since the free piston 107 is prevented by the lock member 115 from being pushed up as described above, there is no such problem as a damage to the bellows.

Cooling water is caused to flow in the heating chamber 51 at the time of high-speed running. Therefore, at the time of high-speed running, the hydraulic pressure from the pressure source 5 is supplied to the pressurizing chamber 108 and to the pressure chamber 113 of the hydraulic damper 1. When the pressurizing chamber 108 is supplied with hydraulic pressure, the free piston 107 is pushed down and the damper piston 102 is pushed down via the elastic member 114, whereby the hydraulic damper 1 is forcibly compressed. As a result of these operations, the vehicle height is lowered, and the expansion of the hydraulic damper 1 comes to be regulated by the elastic member 114 which is the rebound stop rubber, and also the contraction of the hydraulic damper 1 comes to be regulated by the bump stop rubber 118. The wheel rate (a value obtained by dividing a change in load on a vehicle by a vertical displacement of the vehicle) thus becomes strong as shown by line "a" in FIG. 7. As a consequence, both the lifting of the vehicle body on the side of the inner wheel and the sinking of the vehicle body on the side of the outer wheel at the time of cornering are restrained. Even without a stabilizer, a predetermined high rolling rigidity can therefore be obtained, and the moving performance is improved. Further, at the time of high-speed running, the pressure chamber 113 is also being pressurized by the supply pressure from the pressure source 5. Therefore, the flow resistance through the valve body 106b of the bottom valve 106 increases, and the attenuation force on the contraction side of the hydraulic damper 1 becomes large, resulting in a further improvement in the moving performance.

Figure 7:
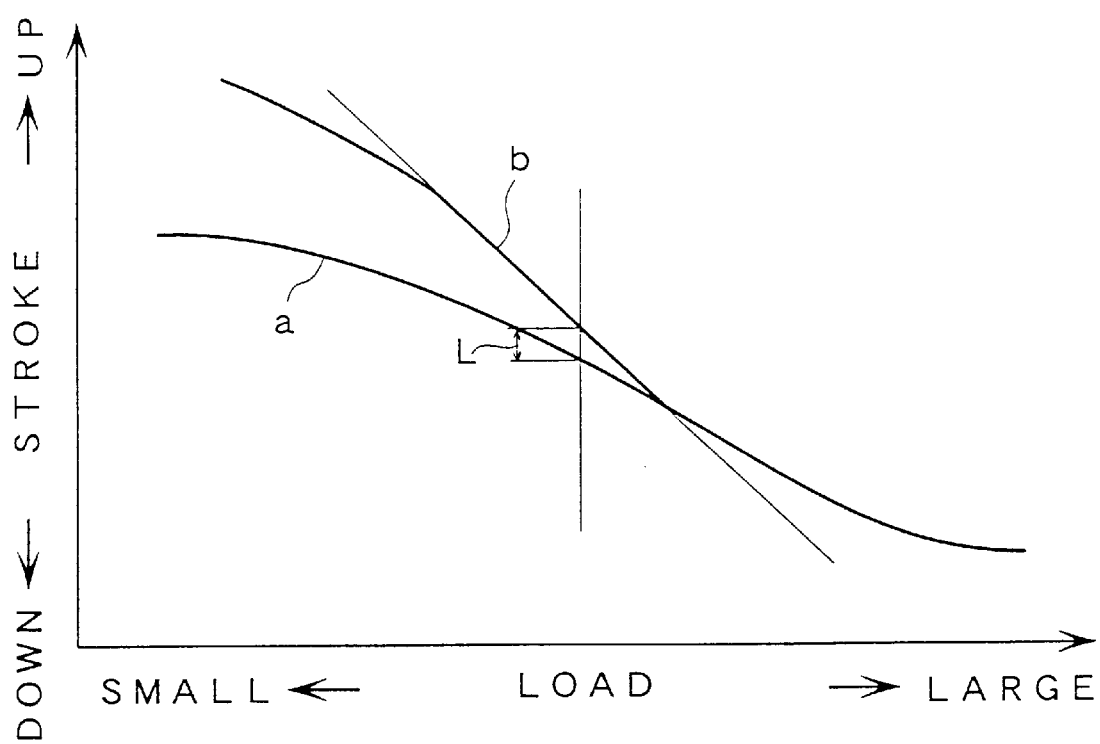
FIG. 7 is a graph showing a wheel rate.

At the time of low-speed running, the supply of cooling water to the heating chamber 51 is stopped. According to this operation, the supply pressure from the pressure source 5 is lowered. The free piston 107 moves up as shown by an imaginary line in FIG. 2. The hydraulic damper 1 extends by the urging force of the suspension spring 4 by a length "L" as shown in FIG. 7, and the vehicle height increases. In this condition, there will occur a clearance between the elastic body 114 and the free piston 107 and, until the hydraulic damper 1 has extended by a length equivalent to this clearance, the wheel rate becomes a value corresponding to the spring rate of the suspension spring 4. Therefore, the wheel rate at the time of low-speed running becomes weak as shown by line "b" in FIG. 7, resulting in an improvement in the cushion characteristics. Further, since the stabilizer can be omitted, the ups and downs on the road surface can effectively be absorbed independently by the right wheel and the left wheel, respectively, resulting in an improvement in the driving comfort.

Even if the supply of cooling water to the heating chamber 51 is stopped, there will be supplied a hydraulic pressure equivalent to that saturated vapor pressure of the medium inside the heat-pressure converting chamber 52 which corresponds to the ambient temperature. Therefore, it is preferable to use, as the medium, one whose saturated vapor pressure at ambient temperature (e.g., 30° C.) is well balanced with the pressure in the gas chamber 105b.

In the above-described embodiment, the pressurizing chamber 108 is arranged to be supplied with the hydraulic pressure. However, a gas pressure from an air pump or the like may also be supplied. In such a case, when the hydraulic damper 1 is forcibly compressed, the pressurizing chamber 108 functions as a gas spring to restrain the expansion of the hydraulic damper 1. The elastic member 114 can therefore be omitted.

Next, an explanation will now be made about a second embodiment of the hydraulic damper 1 as shown in FIGS. 3A and 3B.

This hydraulic damper 1 is provided with a damper main body which is made up of an outer tube 200 and an inner tube 201, and with a rod 203 which is provided at its lower end with a damper piston 202 which is equipped with a valve mechanism. An oil chamber 204 into which is inserted the damper piston 202 is provided inside the inner tube 201, and a reserve chamber 205 is provided between the outer tube 200 and the inner tube 201. The oil chamber 204 and the reserve chamber 205 are arranged to be in fluid flow communication with each other via a bottom valve 206 which is provided at a lower end of the inner tube 201. A so-called twin-tube type of damper is thus constituted. The reserve chamber 205 is filled in its upper portion with a gas.

The change in the amount of oil in the reserve chamber 205 is absorbed by the compression and expansion of the gas to thereby prevent the occurrence of cavitation.

An upper surface and a lower surface of the damper piston 202 are provided with valve plates 202a, 202b which constitute the valve mechanism. In the contraction stroke in which the rod 203 moves downwards, the oil in the lower piston chamber portion of the oil chamber 204 passes through a hole which is formed in the valve plate 202b on the lower surface and an oil hole 202c which is formed in the damper piston 202, and pushes up the valve plate 202a on the upper surface, whereby the oil flows into the upper piston chamber portion of the oil chamber 204. Further, in the extension stroke in which the rod 203 moves upwards, the oil in the upper piston chamber portion passes through the clearance between the valve plate 202a on the upper surface and the damper piston 202 as well as through an oil hole 202d which is formed in the damper piston 202, and pushes down the valve plate 202b on the lower surface, whereby the oil flows into the lower piston chamber portion. By the flow resistance to be given by these valve plates 202a, 202b, the attenuation force at the contraction stroke and the extension stroke is generated.

A cylinder 207 which is slidably inserted or fit onto an outer surface of the rod 203 is provided inside the inner tube 201. A piston 208 which is mounted in that portion of the rod 203 which is above the damper piston 202 is inserted into the cylinder 207 from a lower side, whereby a pressurizing chamber 209 to urge the piston 208 downwards is formed inside the cylinder 207. The piston 208 is mounted so as not to cause a relative downward movement relative to the rod 203, by means of a washer 208a which is fixed to the rod 203. The rod 203 is thus urged downwards by the urging pressure of the pressurizing chamber 209 via the piston 208. The rod 203 is formed into a hollow shape and the hollow portion 203a of the rod 203 is communicated with the pressurizing chamber 209. A joint member 210 which has a connection passage to be communicated with the hollow portion 203a is provided in an upper portion of the rod 203. A piping material 5a which is communicated with the pressure source 5 shown in FIG. 6 is coupled to the joint member 210 so that the fluid pressure from the pressure source 5 can be introduced into the pressurizing chamber 209.

In a position between the cylinder 207 and the upper end of the inner tube 201, there is provided, inside the inner tube 201, an elastic member 211 which functions as a rebound stopper. In the present embodiment, the elastic member 211 is constituted by a coil spring, and a spring receiver 213 which abuts with an upper end of the inner tube 201 via a spacer ring 212 is slidably inserted or fit onto an outer surface of the rod 203. The elastic member 211 is thus interposed between the spring receiver 213 and the cylinder 207. However, a cylindrical rubber which is elongated upwards may also be vertically provided on an upper end of the cylinder 207 to thereby constitute the elastic member 211 by the rubber.

On an outer periphery of an intermediate portion of the outer tube 200, there is provided a lower spring receiver 214 which receives the lower end of the suspension spring 4. On an upper portion of the rod 203, there is provided, in a position below the joint member 210, an upper spring receiver 215 which receives the upper end of the suspension spring 4. Further, the upper spring receiver 215 is provided with a bump stop rubber 216 in a manner to extend vertically downwards. It is thus so arranged that, when the rod 203 is pushed down via the piston 208 by the pressurizing of the pressurizing chamber 209 whereby the hydraulic damper 1 is forcibly contracted, the bump stop rubber 216 comes into abutment with the upper end of the damper main body.

At the time of high-speed running, the hydraulic pressure from the pressure source 5 is supplied to the pressurizing chamber 209 of the hydraulic damper 1, in the same way as in the above-described embodiment. When the pressuring chamber 209 is supplied with a hydraulic pressure, the cylinder 207 moves up first. Once it has moved upwards by a predetermined stroke, the elastic member 211 is compressed between the cylinder 207 and the upper end of the inner tube 201 to thereby regulate a further upward movement of the cylinder 207. Thereafter, the rod 203 is pushed down by the pressurizing force of the pressurizing chamber 209 via the piston 208 as shown in FIG. 3(A), whereby the hydraulic damper 1 is forcibly contracted. According to these operations, the vehicle height is lowered, and the expansion of the hydraulic damper 1 comes to be regulated by the elastic member 211, and also the contraction of the hydraulic damper 1 comes to be regulated by the bump stop rubber 216. The wheel rate therefore becomes strong as shown by line "a" in FIG. 7. As a consequence, both the lifting of the vehicle on the side of the inner wheel and the sinking of the vehicle body on the side of the outer wheel at the time of cornering are restrained. Therefore, even without the stabilizer, a predetermined high rolling rigidity can be obtained and the moving performance can be improved.

At the time of low-speed running, the supply pressure from the pressure source 5 lowers, and the pushing down of the rod 203 by the pressurizing force of the pressurizing chamber 209 is released. The hydraulic damper 1 therefore expands by the length "L" as shown in FIG. 7 by the urging force of the suspension spring 4, as shown in FIG. 3B, whereby the vehicle height increases. In this condition, there will occur a clearance between the upper end of the inner tube 201 and the elastic member 211 (strictly speaking, the spacer ring 212). The wheel rate thus becomes a value which corresponds to the spring rate of the suspension spring 4 until the hydraulic damper 1 has expanded by the amount equivalent to this clearance. Accordingly, the wheel rate at the time of low-speed running becomes weak as shown by line "b" in FIG. 7, resulting in an improvement in the cushion characteristics. Further, since the stabilizer can be omitted, the ups and downs on the road surface can effectively be absorbed independently by the right wheel and the left wheel, respectively, resulting in an improvement in the driving comfort.

Figure 4:
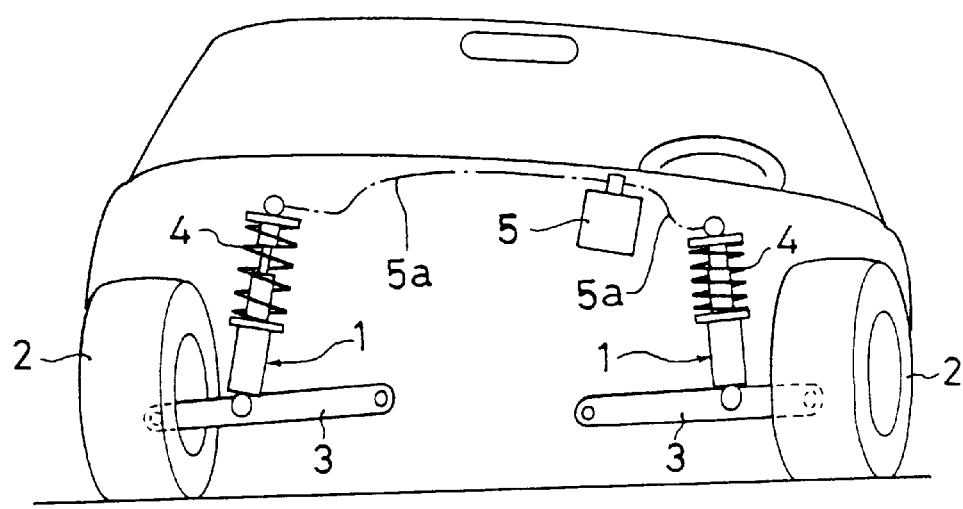
FIG. 4 is a schematic view showing an example of using a second embodiment of the hydraulic damper of the present invention.

At the beginning of pressurizing of, or releasing of, the pressurizing in the pressurizing chamber 209, the cylinder 207 slides relative to the rod 203. However, the cylinder 207 thereafter moves integrally with the rod 203, together with the piston 208. Therefore, there will occur no such problem as wear and friction of a sealing portion of the cylinder 207 and the piston 208 relative to the rod 203. Further, since the joint member 210 is disposed in an upper portion of the rod 203, the piping material 5a which is coupled to the joint member 210 can be disposed in an upper portion of the damper as shown in FIG. 4. Therefore, damages to the piping material 5a due to flying stones or the like can also be prevented.

In the above-described embodiment, the pressurizing chamber 209 is arranged to be supplied with the hydraulic pressure. However, a gas pressure from an air pump or the like may also be supplied. In such a case, when the hydraulic damper 1 is forcibly contracted, the pressurizing chamber 209 functions as a gas spring to regulate the expansion of the hydraulic damper 1. The elastic member 211 can therefore be omitted.

Figure 5:
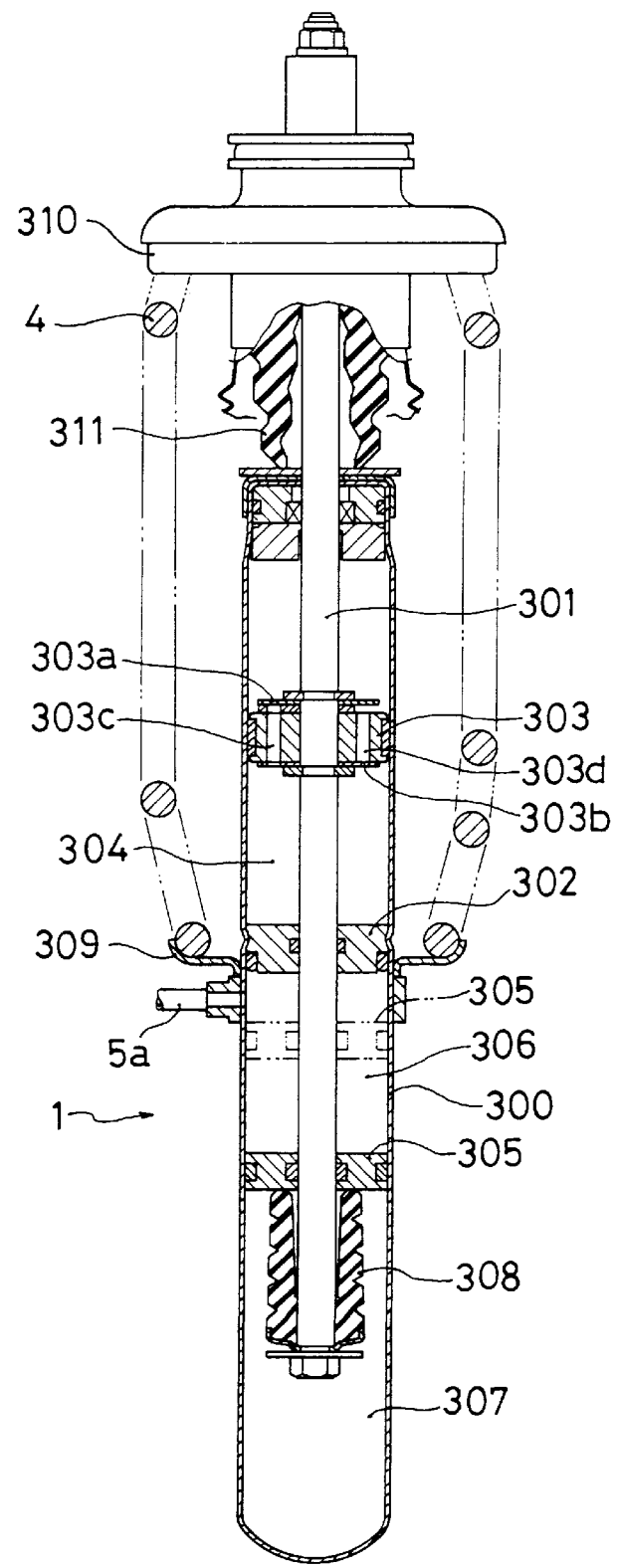
FIG. 5 is a vertical sectional view of a third embodiment of the hydraulic damper of the present invention.

Then, an explanation will now be made about a third embodiment of the hydraulic damper 1 as shown in FIG. 5.

This hydraulic damper 1 is constituted into a so-called mono-tube type of damper which is provided with a cylindrical damper main boy 300, and a rod 301 which extends upwards from inside the damper main body 300. In an intermediate portion, as seen in a vertical direction, there is fixedly provided, inside the damper main body 300, a partition wall 302 which allows the rod 301 to slidably penetrate therethrough. In that portion of the rod 301 which lies above the partition wall 302, there is mounted a damper piston 303 which is equipped with a valve mechanism. The space above the partition wall 302 inside the damper main body 300 is constituted into an oil chamber 304 into which is inserted the damper piston 303.

On an upper surface and a lower surface of the damper piston 303, there are mounted valve plates 303a, 303b which constitute the valve mechanism. In the contraction stroke in which the rod 301 moves down, the oil in the lower piston chamber portion of the oil chamber 304 passes through a hole which is formed in the valve plate 303b on the lower surface and an oil hole 303c which is formed in the damper piston 303 and flows into the upper piston chamber portion of the oil chamber 304 by pushing up the valve plate 303a on the upper surface. In the expansion stroke in which the rod 301 moves up, on the other hand, the oil in the upper piston chamber portion passes through the clearance between the valve plate 303a on the upper surface and the damper piston 303 as well as through the oil hole 303d which is formed in the damper piston 303, and flows into the lower piston chamber portion by pushing down the valve plate 303b on the lower surface. By means of the flow resistance to be given by these valve plates 303a, 303b, an attenuation force in the contraction stroke and the expansion stroke is generated.

The free piston 305 is slidably inserted or fit onto an outer surface of the rod 301 at a position below the partition wall 302. The free piston 305 is slidably inserted into the damper main body 300 at a portion below the partition wall 302. The space between the partition wall 302 and the free piston 305 is thus constituted into a pressurizing chamber 306 into which the hydraulic pressure from the pressure source 5, as shown in FIG. 6, can be introduced via the piping material 5a such as a hose or the like. The space below the free piston 305 is constituted into a gas chamber 307 which is filled with a gas of relatively low pressure. The free piston 305 is prevented from being pulled out of the rod 301 by means of a stopper member 308 which is made up of an elastic member mounted at a lower end of the rod 301. In the present embodiment, the stopper member 308 is constituted by rubber. It may, however, be constituted by a coil spring.

On an outer periphery of an intermediate portion of the damper main body 300, there is provided a lower spring receiver 309 which receives the lower end of the suspension spring 4. On an upper portion of the rod 301, there is provided an upper spring receiver 310 which receives the upper end of the suspension spring 4. Further, the upper spring receiver 310 is provided with a bump stop rubber 311 in a manner to extend vertically downwards. It is thus so arranged that, when the rod 301 is pushed down via the free piston 305 by the pressurizing of the pressurizing chamber 306 to thereby forcibly contract the hydraulic damper 1, the bump stop rubber 311 comes into abutment with the upper end of the damper main body 300.

At the time of high-speed running, the hydraulic pressure from the pressure source 5 is supplied to the pressurizing chamber 306 of the hydraulic damper 1, in the same way as in the above-described embodiments. When the hydraulic pressure is supplied to the pressurizing chamber 306, the free piston 305 is pushed down and the rod 301 is also pushed down via the stopper member 308, whereby the hydraulic damper 1 is forcibly contracted. According to these operations, the vehicle height is lowered, and the expansion of the hydraulic damper 1 comes to be regulated by the stopper member 308 which is made up of an elastic member, and also the contraction of the hydraulic damper 1 comes to be elastically regulated by the bump stop rubber 311. The wheel rate thus becomes strong as shown by line "a" in FIG. 7. Therefore, both the lifting of the vehicle on the side of the inner wheel and the sinking of the vehicle body on the side of the outer wheel at the time of cornering are regulated. As a consequence, even without the stabilizer, a predetermined high rolling rigidity can be obtained and the moving performance can be improved.

At the time of low-speed running, the supply pressure from the pressure source 5 lowers, and the free piston 305 moves up as shown by an imaginary line in FIG. 5. The hydraulic damper 1 thus expands by a length as shown by "L" in FIG. 7 by the urging force of the suspension spring 4, and the vehicle height increases. In this condition, there will occur a clearance between the stopper member 308 and the free piston 305. The wheel rate becomes a value which corresponds to the spring rate of the suspension spring 4 until the hydraulic damper 1 has extended by the amount equivalent to this clearance. Accordingly, the wheel rate at the time of low-speed running becomes weak as shown by line "b" in FIG. 7, resulting in an improvement in the cushion characteristics. Further, since the stabilizer can be omitted, the ups and downs on the road surface can effectively be absorbed independently by the right wheel and the left wheel, respectively, resulting in an improvement in the driving comfort.

In the above-described embodiment, the pressurizing chamber 306 is arranged to be supplied with the hydraulic pressure. However, a gas pressure from an air pump or the like may also be supplied. In such a case, when the hydraulic damper 1 is forcibly compressed, the pressurizing chamber 306 functions as a gas spring to regulate the expansion of the hydraulic damper 1. The stopper member 308 may therefore be constituted by a rigid body.

It is readily apparent that the above-described hydraulic damper for a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A hydraulic damper for a vehicle comprising:
   an outer tube;
   an inner tube;
   a rod provided at its lower end with a damper piston equipped with a valve mechanism;
   wherein an oil chamber for inserting thereinto said damper piston is provided inside said inner tube; and
   wherein a reserve chamber which is in fluid flow communication with said oil chamber is provided between said outer tube and said inner tube;
   characterized in:
      that a free piston which is slidably fit onto an outer surface of said rod above said damper piston is slidably inserted into said inner tube; and
      that a pressurizing chamber which is partitioned from said oil chamber by said free piston and is adapted to receive a fluid pressure from an outside pressure source is provided in an upper portion of said inner tube.

2. A hydraulic damper for a vehicle according to claim 1, further comprising an elastic member disposed inside said inner tube between said free piston and said damper piston.

3. A hydraulic damper for a vehicle according to claim 2, further comprising a lock member provided inside said inner tube between said free piston and said elastic member, said lock member being adapted to block the transmission of an upward urging force to said free piston by biting into said inner tube when the upward urging force from said damper piston is operated via said elastic member.

4. A hydraulic damper for a vehicle according to claim 1, further comprising a pressure chamber which urges a bottom valve at a lower end of said inner tube towards a closing side, said bottom valve being adapted to regulate the flow of oil from said oil chamber to said reserve chamber, said pressure chamber being adapted to receive the hydraulic pressure from said outside pressure source.

\* \* \* \* \*